(12) United States Patent
Hayward et al.

(10) Patent No.: US 7,336,266 B2
(45) Date of Patent: *Feb. 26, 2008

(54) HAPTIC PADS FOR USE WITH USER-INTERFACE DEVICES

(75) Inventors: Vincent Hayward, Montreal (CA); Ramon Alarcon, Santa Clara, CA (US); Louis B. Rosenberg, San Jose, CA (US)

(73) Assignee: Immersion Corproation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/369,106

(22) Filed: Feb. 20, 2003

(65) Prior Publication Data

US 2004/0164971 A1 Aug. 26, 2004

(51) Int. Cl.
*G09G 5/00* (2006.01)

(52) U.S. Cl. .................. 345/179; 345/173; 345/163; 345/167; 345/168; 178/18.05; 178/19.01; 178/19.03; 178/19.04; 178/19.05; 463/37; 715/702

(58) Field of Classification Search ........ 345/156–183; 178/18.06, 18.07, 18.01, 18.02, 18.03, 18.04, 178/18.05, 19.01, 19.04; 341/32–34, 27; 463/37–38
See application file for complete search history.

(56) References Cited

U.S. PATENT DOCUMENTS

| | | | |
|---|---|---|---|
| 3,157,853 A | 11/1964 | Hirsch | |
| 3,220,121 A | 11/1965 | Cutler | |
| 3,497,668 A | 2/1970 | Hirsch | |
| 3,517,446 A | 6/1970 | Corlyon et al. | |
| 3,623,064 A | 11/1971 | Kagan | |
| 3,730,621 A | 5/1973 | Sullivan, Jr. | |
| 3,902,687 A | 9/1975 | Hightower | |
| 3,903,614 A | 9/1975 | Diamond et al. | |
| 3,911,416 A | 10/1975 | Feder | |
| 3,935,485 A | 1/1976 | Yoshida | |
| 3,940,637 A | 2/1976 | Ohigashi et al. | |
| 4,023,290 A | 5/1977 | Josephson | |

(Continued)

FOREIGN PATENT DOCUMENTS

DE 101 54 643 A1 * 5/2003

(Continued)

OTHER PUBLICATIONS

Joseph Rovan and Vincent Hayward, *Typology of Tactile Sounds and their Synthesis in Gesture-Driven Computer Music Performance*, "Trends in Gestural Control of Music", 2000, pp. 297-320, Paris.

(Continued)

*Primary Examiner*—Lun-Yi Lao
(74) *Attorney, Agent, or Firm*—Thelen Reid Brown Taysman & Steiner LLP (57) ABSTRACT

Embodiments of the invention relate to haptic devices for use with a variety of computer/video interface devices. Such haptic devices can work in conjunction with and thereby provide "haptic augmentations" to otherwise conventional user-interface devices, including a variety of computer mice known in the art, irrespective of their types and manufactures. Such haptic devices can also be used to convey information to a user by way of haptic sensations.

13 Claims, 2 Drawing Sheets

U.S. PATENT DOCUMENTS

| | | |
|---|---|---|
| 4,101,884 A | 7/1978 | Benton, Jr. |
| 4,108,164 A | 8/1978 | Hall, Sr. |
| 4,127,752 A | 11/1978 | Lowthorp |
| 4,160,508 A | 7/1979 | Frosch et al. |
| 4,236,325 A | 12/1980 | Hall et al. |
| 4,242,823 A | 1/1981 | Bruno |
| 4,414,537 A | 11/1983 | Grimes |
| 4,414,984 A | 11/1983 | Zarudiansky |
| 4,513,235 A | 4/1985 | Acklam et al. |
| 4,550,221 A | 10/1985 | Mabusth |
| 4,557,275 A | 12/1985 | Dempsey, Jr. |
| 4,581,491 A | 4/1986 | Boothroyd |
| 4,584,625 A | 4/1986 | Kellogg |
| 4,599,070 A | 7/1986 | Hladky et al. |
| 4,633,123 A | 12/1986 | Radice |
| 4,692,756 A | 9/1987 | Clark |
| 4,708,656 A | 11/1987 | de Vries et al. |
| 4,713,007 A | 12/1987 | Alban |
| 4,715,235 A | 12/1987 | Fukui et al. |
| 4,757,453 A | 7/1988 | Nasiff |
| 4,758,165 A | 7/1988 | Tieman et al. |
| 4,772,205 A | 9/1988 | Chlumsky et al. |
| 4,780,707 A * | 10/1988 | Selker .................. 345/163 |
| 4,791,416 A | 12/1988 | Adler |
| 4,794,392 A | 12/1988 | Selinko |
| 4,821,030 A | 4/1989 | Batson et al. |
| 4,831,566 A * | 5/1989 | Matthews et al. ............ 702/95 |
| 4,871,992 A | 10/1989 | Peterson |
| 4,885,565 A | 12/1989 | Embach |
| 4,891,764 A | 1/1990 | McIntosh |
| 4,899,137 A * | 2/1990 | Behrens et al. ............ 345/168 |
| 4,926,010 A * | 5/1990 | Citron .................... 178/18.07 |
| 4,926,879 A | 5/1990 | Sevrain et al. |
| 4,930,770 A | 6/1990 | Baker |
| 4,934,694 A | 6/1990 | McIntosh |
| 4,975,616 A | 12/1990 | Park |
| 5,019,761 A | 5/1991 | Kraft |
| 5,022,407 A | 6/1991 | Horch et al. |
| 5,035,242 A | 7/1991 | Franklin et al. |
| 5,038,089 A | 8/1991 | Szakaly |
| 5,072,076 A * | 12/1991 | Camp, Jr. ................ 178/18.05 |
| 5,078,152 A | 1/1992 | Bond et al. |
| 5,121,091 A | 6/1992 | Fujiyama |
| 5,136,194 A | 8/1992 | Oudet et al. |
| 5,143,505 A | 9/1992 | Burdea et al. |
| 5,159,159 A | 10/1992 | Asher |
| 5,165,897 A | 11/1992 | Johnson |
| 5,186,629 A | 2/1993 | Rohen |
| 5,212,473 A | 5/1993 | Louis |
| 5,223,658 A | 6/1993 | Suzuki |
| 5,237,327 A | 8/1993 | Saitoh et al. |
| 5,240,417 A | 8/1993 | Smithson et al. |
| 5,262,777 A | 11/1993 | Low et al. |
| 5,271,290 A | 12/1993 | Fischer |
| 5,275,174 A | 1/1994 | Cook |
| 5,299,810 A | 4/1994 | Pierce et al. |
| 5,309,140 A | 5/1994 | Everett, Jr. et al. |
| 5,316,017 A | 5/1994 | Edwards et al. |
| 5,334,027 A | 8/1994 | Wherlock |
| 5,355,148 A | 10/1994 | Anderson |
| 5,376,948 A | 12/1994 | Roberts |
| 5,389,849 A * | 2/1995 | Asano et al. .......... 310/323.21 |
| 5,437,607 A | 8/1995 | Taylor |
| 5,446,480 A * | 8/1995 | Yoshida .................... 345/157 |
| 5,466,213 A | 11/1995 | Hogan et al. |
| 5,521,336 A | 5/1996 | Buchanan et al. |
| 5,547,382 A | 8/1996 | Yamasaki et al. |
| 5,555,894 A | 9/1996 | Doyama et al. |
| 5,562,707 A | 10/1996 | Prochazka et al. |
| 5,563,632 A | 10/1996 | Roberts |
| 5,580,251 A | 12/1996 | Gilkes et al. |
| 5,638,060 A | 6/1997 | Kataoka et al. |
| 5,650,704 A | 7/1997 | Pratt et al. |
| 5,670,755 A * | 9/1997 | Kwon .................... 178/18.05 |
| 5,719,561 A | 2/1998 | Gonzales |
| 5,729,249 A | 3/1998 | Yasutake |
| 5,766,016 A | 6/1998 | Sinclair et al. |
| 5,767,457 A | 6/1998 | Gerpheide et al. |
| 5,785,630 A | 7/1998 | Bobick et al. |
| 5,825,308 A | 10/1998 | Rosenberg |
| 5,828,197 A | 10/1998 | Martin et al. |
| 5,831,597 A * | 11/1998 | West et al. ................. 345/163 |
| 5,835,080 A | 11/1998 | Beeteson et al. |
| 5,857,986 A | 1/1999 | Moriyasu |
| 5,887,995 A | 3/1999 | Holehan |
| 5,889,236 A | 3/1999 | Gillespie et al. |
| 5,896,191 A | 4/1999 | Beier et al. |
| 5,917,906 A | 6/1999 | Thornton |
| 5,942,733 A * | 8/1999 | Allen et al. .............. 178/18.01 |
| 5,943,044 A | 8/1999 | Martinelli et al. |
| 5,977,685 A | 11/1999 | Kurita et al. |
| 5,977,867 A * | 11/1999 | Blouin .................... 340/407.2 |
| 5,982,304 A | 11/1999 | Selker et al. |
| 5,986,643 A | 11/1999 | Harvill et al. |
| 5,988,902 A | 11/1999 | Holehan |
| 6,003,390 A * | 12/1999 | Cousy ...................... 73/865.7 |
| 6,008,800 A | 12/1999 | Pryor |
| 6,067,081 A * | 5/2000 | Hahlganss et al. .......... 345/173 |
| 6,072,475 A | 6/2000 | van Ketwich et al. |
| 6,118,435 A | 9/2000 | Fujita et al. |
| 6,140,987 A | 10/2000 | Stein et al. |
| 6,239,790 B1 | 5/2001 | Martintelli et al. |
| 6,243,080 B1 | 6/2001 | Molne |
| 6,326,901 B1 | 12/2001 | Gonzales |
| 6,337,678 B1 * | 1/2002 | Fish .......................... 345/156 |
| 6,353,427 B1 | 3/2002 | Rosenberg |
| 6,377,249 B1 * | 4/2002 | Mumford .................. 345/179 |
| 6,379,393 B1 | 4/2002 | Mavroidis et al. |
| 6,388,655 B1 | 5/2002 | Leung |
| 6,414,674 B1 | 7/2002 | Kamper et al. |
| 6,415,138 B2 * | 7/2002 | Sirola et al. ............... 455/90.1 |
| 6,422,941 B1 | 7/2002 | Thorner et al. |
| 6,429,846 B2 | 8/2002 | Rosenberg et al. ......... 345/156 |
| 6,445,284 B1 | 9/2002 | Cruz-Hernandez et al. |
| 6,469,695 B1 | 10/2002 | White |
| 6,473,069 B1 | 10/2002 | Gerpheide |
| 6,509,892 B1 | 1/2003 | Kamper et al. |
| 6,518,958 B1 | 2/2003 | Mayajima et al. |
| 6,529,122 B1 | 3/2003 | Magnussen et al. |
| 6,529,189 B1 * | 3/2003 | Colgan et al. ............. 345/179 |
| 6,535,201 B1 | 3/2003 | Cooper et al. |
| 6,545,384 B1 | 4/2003 | Pelrine et al. |
| 6,583,533 B2 | 6/2003 | Pelrine et al. |
| 6,585,595 B1 | 7/2003 | Soma |
| 6,586,859 B2 | 7/2003 | Kornbluh et al. |
| 6,610,936 B2 | 8/2003 | Gillespie et al. |
| 6,628,195 B1 | 9/2003 | Coudon |
| 6,636,202 B2 | 10/2003 | Ishmael, Jr. et al. |
| 6,639,582 B1 | 10/2003 | Schrader |
| 6,647,145 B1 | 11/2003 | Gay |
| 6,710,518 B2 | 3/2004 | Morton et al. |
| 6,806,621 B2 | 10/2004 | Heim et al. |
| 6,809,462 B2 | 10/2004 | Pelrine et al. |
| 6,822,635 B2 * | 11/2004 | Shahoian et al. .......... 345/156 |
| 6,834,373 B2 | 12/2004 | Dieberger |
| 6,876,135 B2 | 4/2005 | Pelrine et al. |
| 6,891,317 B2 | 5/2005 | Pei et al. |
| 6,940,211 B2 | 9/2005 | Pelrine et al. |
| 7,009,595 B2 | 3/2006 | Roberts et al. |
| 7,113,177 B2 | 9/2006 | Franzen |
| 7,148,875 B2 | 12/2006 | Rosenberg et al. |
| 7,151,528 B2 | 12/2006 | Taylor et al. |
| 2001/0035854 A1 * | 11/2001 | Rosenberg et al. ......... 345/156 |
| 2002/0033795 A1 * | 3/2002 | Shahoian et al. ........... 345/156 |

| | | | |
|---|---|---|---|
| 2002/0149561 | A1 | 10/2002 | Fukumoto et al. |
| 2002/0149570 | A1 | 10/2002 | Knowles et al. |
| 2003/0006892 | A1 | 1/2003 | Church |
| 2003/0016211 | A1 | 1/2003 | Woolley |
| 2003/0030628 | A1 | 2/2003 | Sato et al. |
| 2003/0038776 | A1* | 2/2003 | Rosenberg et al. ......... 345/156 |
| 2003/0058265 | A1* | 3/2003 | Robinson et al. ........... 345/701 |
| 2004/0075676 | A1* | 4/2004 | Rosenberg et al. ......... 345/701 |

FOREIGN PATENT DOCUMENTS

| | | |
|---|---|---|
| EP | 0 349 086 A1 | 1/1990 |
| EP | 0 556 999 B1 | 5/1998 |
| JP | 6-018341 | 1/1994 |
| JP | 7-135345 | 5/1995 |
| JP | 8-335726 | 12/1996 |
| JP | 11-299305 | 2/1999 |
| JP | 2001-350592 | 12/2001 |
| JP | 2002-157087 | 5/2002 |
| JP | 2002-236543 | 8/2002 |
| JP | 2002-259059 | 9/2002 |
| WO | WO 92/00559 A1 | 1/1992 |
| WO | WO 95/20788 A1 | 8/1995 |
| WO | WO 97/18546 | 5/1997 |
| WO | WO 02/12991 A1 | 2/2002 |
| WO | WO 02/27645 A1 | 4/2002 |
| WO | WO 02/31807 A1 | 4/2002 |

OTHER PUBLICATIONS

Written Opinion of the International Searching Report, PCT/US04/04573, International filing date Feb. 18, 2004, Search Report mailed Mar. 10, 2005.

Notification of Transmittal of the International Search Report and the Written Opinion of the International Searching Authority, or the Declaration, PCT/US04/04573, International filing date Feb. 18, 2004, Search Report mailed Mar. 10, 2005.

Baigrie, "Electric Control Loading—A Low Cost, High Performance Alternative," *Proceedings of Interservice/Industry Training Systems Conference*, pp. 247-254, Nov. 6-8, 1990.

Iwata, "Pen-based Haptic Virtual Environment," 0-7803-1363-1/93 IEEE, pp. 287-292, 1993.

Russo, "The Design and Implementation of a Three Degree of Freedom Force Output Joystick," *MIT Libraries Archives* pp. 1-131, May 1990, archived Aug. 14, 1990.

Brooks et al., "Hand Controllers for Teleoperation—A State-of-the Art Technology Survey and Evaluation," *JPL Publication 85-11*, NASA-CR-175890; N85-28559, pp. 1-84, Mar. 1, 1985.

Jones et al., "A perceptual analysis of stiffness," ISSN 0014-4819 Springer International (Springer-Verlag); *Experimental Brain Research*, vol. 79, No. 1, pp. 150-156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25-44, May 2, 1993.

Snow et al., Model-X Force-Reflecting-Hand-Controller, NT Control No. NPO-17851; JPL Case No. 7348, pp. 1-4 with 45 pages of attachments, Jun. 15, 1989.

Ouh-Young, "Force Display in Molecular Docking," Doctoral Dissertation, University of North Carolina at Chapel Hill, UMI Order No. 9034744, p. 1-369, 1990.

Tadros, "Control System Design for a Three Degree of Freedom Virtual Environment Simulator Using Motor/Brake Pair Actuators," *MIT Archive*, pp. 1-88, Feb. 1990, archived Aug. 13, 1990.

Caldwell et al., "Enhanced Tactile Feedback (Tele-Taction) Using a Multi-Functional Sensory System," 1050-4729/93, pp. 955-960, 1993.

Adelstein et al., "Design and Implementation of a Force Reflecting Manipulation for Manual Control research," DSC-vol. 42, *Advances in Robotics*, pp. 1-12, 1992.

Gotow et al., "Controlled Impedance Test Apparatus for Studying Human Interpretation of Kinesthetic Feedback," WA11-11:00, pp. 332-337.

Stanley et al., "Computer Simulation of Interacting Dynamic Mechanical Systems Using Distributed Memory Parallel Processors," DSC-vol. 42, *Advances in Robotics*, pp. 55-61, ASME 1992.

Russo, "Controlling Dissipative Magnetic Particle Brakes in Force Reflective Devices," DSC-vol. 42, *Advances in Robotics*, pp. 63-70, ASME 1992.

Kontarinis et al., "Display of High-Frequency Tactile Information to Teleoperators," *Telemanipulator Technology and Space Telerobotics*, Won S. Kim, Editor, Proc. SPIE vol. 2057, pp. 40-50, Sep. 7-9, 1993.

Patrick et al., "Design and Testing of A Non-reactive, Fingertip, Tactile Display for Interaction with Remote Environments," *Cooperative Intelligent Robotics in Space*, Rui J. deFigueiredo et al, Editor, Proc. SPIE vol. 1387, pp. 215-222, 1990.

Adelstein, "A Virtual Environment System For The Study of Human Arm Tremor," *Ph.D Dissertation*, Dept. of Mechanical Engineering, MIT, Jun. 1989, archived Mar. 13, 1990.

Bejczy, "Sensors, Controls, and Man-Machine Interface for Advanced Teleoperation," *Science*, vol. 208, No. 4450, pp. 1327-1335, 1980.

Bejczy et al., "Generalization of Bilateral Force-Reflecting Control of Manipulators," *Proceedings Of Fourth CISM-IFToMM*, Sep. 8-12, 1981.

McAffee et al., "Teleoperator Subsystem/Telerobot Demonstrator: Force Reflecting Hand Controller Equipment Manual," *JPL* 1988, JPL D-5172.

Minsky, "Computational Haptics: The Sandpaper System for Synthesizing Texture for a Force-Feedback Display," *Ph.D. Dissertation*, MIT, Jun. 1995, archived Jul. 6, 1995.

Jacobsen et al., "High Performance, Dextrous Telerobotic Manipulator With Force Reflection," *Intervention/ROV '91 Conference & Exposition*, Hollywood, Florida, May 21-23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30-Oct. 1, 1992.

IBM Technical Disclosure Bulletin, "Mouse Ball-Actuating Device With Force and Tactile Feedback," vol. 32, No. 9B, Feb. 1990.

Terry et al., "Tactile Feedback In A Computer Mouse," *Proceedings of Fourteenth Annual Northeast Bioengineering Conference, University of New Hampshire*, Mar. 10-11, 1988.

Howe, "A Force-Reflecting Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR—A Haptic display for speech perception by deaf and deaf-blind individuals," *IEEE Virtual Reality Annual International Symposium*, Seattle, WA, Sep. 18-22, 1993.

Rabinowitz et al., "Multidimensional tactile displays: Identification of vibratory intensity, frequency, and contractor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12-15, 1980.

Bejczy et al., "A Laboratory Breadboard System For Dual-Arm Teleoperation," *SOAR '89 Workshop, JSC*, Houston, TX, Jul. 25-27, 1989.

Ouhyoung et al., "A Low-Cost Force Feedback Joystick and Its Use in PC Video Games," *IEEE Transactions on Consumer Electronics*, vol. 41, No. 3, Aug. 1995.

Marcus, "Touch Feedback in Surgery," *Proceedings of Virtual Reality and Medicine The Cutting Edge*, Sep. 8-11, 1994.

Bejczy, et al., "Universal Computer Control System (UCCS) For Space Telerobots," CH2413-3/87/0000/0318501.00 1987 IEEE, 1987.

Bliss, James C., "Optical-to-Tactile Image Conversion for the Blind," IEEE Transactions on Man-Machine Systems, vol. MMS-11, No. 1, 1970, pp. 58-65.

Bolanowski, S.J. et al., "Four Channels Mediate the Mechanical Aspects of Touch," J. Acoust. Soc. Am. 84 vol. 84 (5), Nov. 1988, pp. 1680-1694.

Eberhardt, Silvio P. et al., "OMAR—A Haptic Display for Speech Perception by Deaf and Deaf-Blind Individuals," IEEE 1993, pp. 195-201.

Frisken-Gibson, Sarah F. et al, "A 64-Solenoid, Four-Level Fingertip Search Display for the Blind," IEEE Transactions on Biomedical Engineering, vol. BME-34, No. 12, Dec. 1987, pp. 963-965.

Fukumoto, Masaaki et al., "Active Click: Tactile Feedback for Touch Panels," NTT DoCoMo Multimedia Labs, Apr. 2001, pp. 121-122.

Goldstein, Moise H. et al., "Tactile Aids for the Profoundly Deaf Child," 77 J. Acoust. Soc. Am 77 (1), Jan. 1985, pp. 258-265.

Jackson, K. M., "Linearity of Radio-Frequency Transducers," Med. & Biol. Eng. and Computer, Jul. 1977, 15, pp. 446-449.

Johnson, David A., "Shape-Memory Alloy Tactical Feedback Actuator," Tini Allow Company, Inc., Aug. 1990, 2 pages, pp. i-33.

Kaczmarek, Kurt A. et al, "Electrotactile and Vibrotactile Displays for Sensory Substitution Systems", IEEE Transactions on Biomedical Engineering, vol. 38, No. 1, Jan. 1991, pp. 1-16.

Kaczmarek, K. A. et al. "Tactile Displays," in: Virtual Environments and Advanced Interface Design, New York: Oxford University Press, 1995, pp. 349-414.

Peine, W.J., "Tactile Shape Displays for Small Scale Shape Feedback," http://www.hrl.harvard.edu/~peine/display.html, 1998, pp. 1-2.

Poupyrev, Ivan et al, "Tactile interfaces for Small Touch Screens," AMC 2003, vol. 5, Issue 2, 2003, pp. 217-220.

Ramstein, Christophe, "Combining Haptic and Braille Technologies: Design Issues and Pilot Study," Assets '96, 2nd Annual ACM Conference on Assistive Technologies, ACM Sigraph, Apr. 1996, pp. 37-44.

SMK "Force Feedback Type Optical Touch Panel Developed," SMK Corporation, No.: 631csc, http://www.smk.co.jp/whatsnew_e/631csc_e.html, Oct. 30, 2002, pp. 1-2.

SMK, "Multi-Functional Touch Panel, Force-Feedback Type, Developed," SMK Corporation, No.: 628csc, http://www.smk.co.jp.whatsnew_e/628csc_e.html, Sep. 30, 2002, pp. 1-2.

SMK, "Force Feedback Touch Panel," SMK Corporation, For Reference, 1 page.

Wiker, Steven F., "Teletouch Display Development: Phase 1 Report," Naval Ocean Systems Center, Technical Report 1230, Jul. 1988, 66 pages.

Wiker, Steven F. et al., "Development of Tactile Mice for Blind Access to Computers: Importance of Stimulation Locus, Object Size, and Vibrotactile Display Resolution," Proceedings of the Human Factors Society 35th Annual Meeting, 1991, pp. 708-712.

* cited by examiner

HAPTIC PADS FOR USE WITH USER-INTERFACE DEVICES

FIELD OF THE INVENTION

This invention relates generally to haptic-feedback systems. More specifically, embodiments of the present invention relate to haptic devices for use with a variety of computer/video interface devices.

BACKGROUND

Haptic feedback provides for a new modality of sensing and enhances human experiences in many applications.

Known haptic-enabled interface devices are typically constructed as integrated devices, where haptic-enabling components (e.g., actuators and associated control circuits) are integrated with other functional components to form a single structure for a given device. In a haptic computer mouse (e.g., the iFeel mouse manufactured by Logitech) for example, actuator and associated electronics (which may include a local processor) are disposed within and coupled to the same housing that also encloses an otherwise conventional mouse, thereby imparting tactile sensations to a user in contact with the housing. While such an "all-in-one" construction renders a simpler appearance to the overall structure, it affords more complexity and cost to the manufacturing of such haptic devices and in some instances, limits or compromises haptic effects that can be delivered. Moreover, the integration of haptic capabilities varies not only with the device type, but also with the device manufacturer. As such, consumers are left with fewer choices, if haptic feedback is desired. In some situations, for instance, a consumer may have to abandon his/her favorite mouse, in order to adapt a haptic one.

A need thus exists for a new type of haptic-rendering devices that overcome the above shortcomings.

BRIEF SUMMARY OF THE INVENTION

A haptic device comprises a contact surface and an actuator coupled to the contact surface. The actuator is configured to receive a control signal responsive to an input from a user-interface device physically distinct from and removably coupled to the contact surface, and output a haptic effect to the contact surface.

DETAILED DESCRIPTION OF THE INVENTION

Embodiments of the invention relate to a haptic pad (or plate) for use with a variety of user-interface devices, and for complementing user's experiences in interacting with a computer (or video) system.

In one embodiment of the invention, a haptic device comprises: a pad having a contact surface; and an actuator coupled to the pad. The actuator is configured to receive a control signal responsive to an input from a user-interface device physically distinct from and removably coupled to the contact surface, and output a haptic effect to the contact surface.

The user-interface device (e.g., a computer mouse) can be disposed on and manipulated therefrom the contact surface. A processor (e.g., included in a computer) is operable to generate the control signal in response to the input from the user-interface device, and transmits the control signal to the actuator. The corresponding haptic effect output by the actuator imparts haptic (e.g., tactile) sensations to a user manipulating the user-interface device.

The haptic device thus described can be used as a "generic" haptic-output device, e.g., working in conjunction with and provide "haptic augmentations" to conventional (or "non-haptic") user-interface devices, such as a wide variety of computer mice known in the art, irrespective of their types and manufactures. It can also be used to convey information to a user by way of haptic sensations.

The ensuing description provide further examples of the invention.

Figure 1:
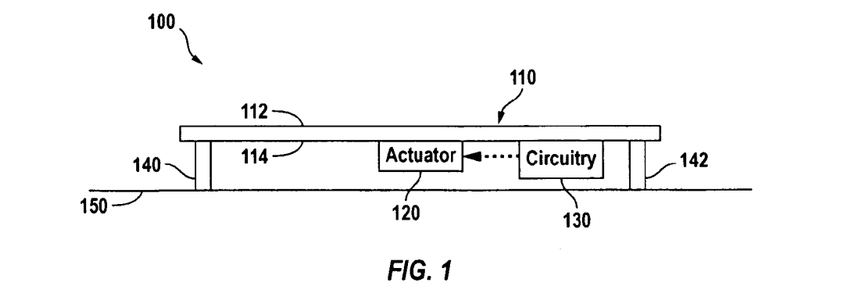
FIG. 1 shows a haptic device, according to an embodiment of the invention.

FIG. 1 depicts a schematic illustration of a haptic device 100, according to an embodiment of the invention. By way of example to illustrate some general principles and architecture of the invention, the haptic device 100 comprises a pad 110, which may include a contact surface 112 and an underside 114; an actuator 120; a circuitry 130; and one or more compliant elements such as first and second compliant elements 140, 142. The actuator 120 and the circuitry 130 are coupled to, e.g., attached to the underside 114 of the pad 110, as shown in this embodiment. The circuitry 130 sends a control signal to the actuator 120. The actuator 120, in turn, outputs a haptic effect to the pad 110. The compliant elements 140, 142 are coupled (e.g., attached) to the underside 114 of the pad 110. The compliant elements 140, 142 serve to mechanically isolate the pad 110, e.g., from a ground surface 150 on which the pad 110 is disposed, such that the haptic effect imparted by the actuator 120 is contained and thereby maximized within the pad 110.

Figure 2:
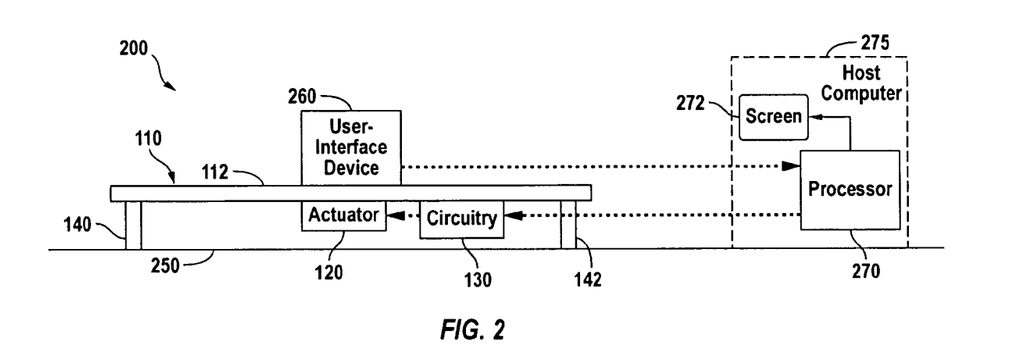
FIG. 2 depicts an application of a haptic device, according to an embodiment of the invention.

In one embodiment, the control signal from the circuitry 130 may be responsive to an input from a user-interface device. FIG. 2 depicts an application 200 of the haptic device 100, according to an embodiment of the invention. It will be appreciated that like elements are labeled by like numerals in FIGS. 1-2 (as well as in other figures). In this embodiment, the pad 110, along with the actuator 120 and the circuitry 130, is supported by the compliant elements 140, 142 on a ground surface 250 which may be a desk (or table) top. By way of example, a user-interface device 260, which may be for example a computer mouse, is disposed on and manipulatable from the contact surface 112 of the pad 110. The user-interface device 260 can be translated, and/or rotated on the contact surface 112, for instance. The contact surface 112 can be made substantially planar, and/or of a sufficient size, so as to facilitate the operation of the user-interface device 260. The contact surface 112 (or the pad 110) can also be made to look and/or feel like a "mouse pad," for example, if so desired in a given application. The user-interface device 260 is in communication with a processor 270, which may be included for example in a "host" computer (or video system) 275. The circuitry 130 can include a data communication interface, such as a Universal Serial Bus (USB) port or a wireless receiver/transmitter, configured to communicate between the processor 270 and the actuator 120. The circuitry 130 may further include other electronic circuits devised for facilitating the operation of the actuator 110, such as power supplies/amplifiers.

In the above, a user (not explicitly shown in FIG. 2) can manipulate the interface device 260 on the contact surface 112 of the pad 110, and experience the haptic effects that are correlated with his/her manipulation. By way of example, the processor 270 can operate to detect an input from the user-interface device 260 (e.g., as a result of a movement of the user-interface device 260), which may also be associated with a feature shown on a display screen 272 of the computer 275. The processor 270 further generates a control signal based upon the input from the user-interface device 260 and transmits the control signal to the actuator 120 by way of the circuitry 130. The actuator 120, in turn, outputs a haptic effect to the pad 110 that is correlated with the user's manipulation of the user-interface device 260. The user can experience the corresponding haptic sensations via the user-interface device 260, and/or via direct contact with the contact surface 112 of the pad 110.

In one scenario, the haptic effect thus generated can be coordinated with the cursor position at a particular location on the display screen 272, such as an icon, a menu item or a button, as a result of the user's manipulation of the user-interface device 260. In another scenario, the haptic effect can be correlated with a feature in a virtual reality environment (e.g., a video game, a medical or flight simulation) displayed on the display screen 272, with which the user is interacting by way of the user-interface device 260. In yet another scenario, the haptic effect can also be used to assist the user's online shopping, navigating web pages, and the like. As such, the haptic device 100 enables the user to interact with a computer/video system by way of a conventional (or "non-haptic") user-interface device, such as one of a variety of mice readily available in the art, yet still being able to feel haptic sensations that complement and enhance his/her experiences.

It will be appreciated that the user-interface device 260 need not be situated on the contact surface 112 of the pad 110, as illustrated by the embodiment of FIG. 2. For instance, a user may use a right hand to manipulate the user-interface device 260 (e.g., a mouse) on the desktop 250, and place a left hand on the contact surface 112 of the pad 110 to experience the haptic sensations thus generated.

In another scenario, the control signal from the circuitry 130 can be related to an "internal event," e.g., generated by the computer 275 shown in FIG. 2. The internal event can include (but is not limited to), for example, an alert for an incoming message such as an email or text message, or a schedule-reminder for a pre-scheduled activity such as a meeting or an appointment. In this case, a user may be in direct contact with the pad 110, e.g., by placing a hand (or an arm) on the contact surface 112. The processor 270 is configured to generate a control signal upon the occurrence of an event (e.g., an incoming email), and to transmit the control signal to the actuator 120 by way of the circuitry 130.

The actuator 120, in turn, outputs a corresponding haptic effect to the pad 110, thereby alerting the user the incoming email. Haptic effects can also be output to the pad 110 in accordance with a pre-determined scheme, e.g., to remind the user of a pre-scheduled activity (such as an appointment). Furthermore, haptic effects with different characteristics (e.g., vibrations with different frequencies and/or amplitudes) can also be assigned to different types of internal events.

The internal event in the above can also include a sound effect, thereby allowing a user to "feel" the sound effect by way of haptic sensations, for instance. In this scenario, a user may be in direct contact with the pad 110, e.g., by placing a hand (or another body part) on the contact surface 112. The processor 270 operates to generate and transmit an appropriate control signal to the circuitry 130, as a sound effect (e.g., a music file) is played. The actuator 120, in turn, receives the control signal from the circuitry 130 and outputs a corresponding haptic effect to the pad 110, thus allowing the user to "feel" the sound effect he/she is listening to. For example, a sequence of haptic effects can be output that are coordinated with various music notes (and/or melodies) in a music file. Likewise, haptic effects can also be used to complement sound effects in a video game, or other virtual reality environments.

The internal event in the above can further include a visual effect, such as showing a video or DVD. For example, a user can be in direct contact with the pad 110, e.g., by placing a hand (or another body part) on the contact surface 110. The processor 270 operates to generate and transmit an appropriate control signal to the circuitry 130, as a visual effect (e.g., a video or DVD file) is played. The actuator 120, in turn, receives the control signal from the circuitry 130 and outputs a corresponding haptic effect to the pad 110, thus complementing the visual effect the user is watching. For example, various haptic effects can be output that are coordinated with different events/features in a video file. Likewise, haptic effects can also be used to complement visual effects in other virtual reality environments, such medical, driving, or flying simulations.

In the above, the term "haptic effect" is construed broadly to encompass any type of force feedback that is capable of effecting haptic sensations, such as tactile or kinesthetic sensations, to a user in contact with a haptic device. The tactile sensations may further include vibrations, pulses, jolts, textures, and the like.

The compliant elements 140, 142 serve to mechanically isolate the pad 110 (along with the actuator 120) from the ground surface 150 (or the desktop 250) on which it is disposed, whereby the haptic effect output to the pad 110 is "contained" (or "localized") within the pad 110, with as little transmission to the outside as possible. This renders a broader dynamic range (e.g., greater magnitude and/or wider frequency range) to the haptic sensations experienced by the user. In this manner, the compliant elements 140, 142 can include any means that mechanically decouples the pad 110 from a ground surface (such as the desktop 250) on which it is disposed. For instance, the compliant elements 140, 142 can include suitable flexible and/or elastic materials, such as rubber or foam, that damp out (or absorb) the force-feedback effect such as vibrations imparted to the pad 110. In one embodiment, the compliant elements 140, 142 can be made like "elastic feet" in support of the pad 110. In another embodiment, the compliant elements 140, 142 can also be configured as a contiguous piece, e.g., in the shape of a ring that is attached to the outer perimeter of the underside 114 of the pad 110. In yet another embodiment, the actuator 120 can be equipped with an "elastic foot" (such as the second compliant element 142), which as a whole provides support to the pad 110 (along with the first compliant element 140).

It will be also appreciated that the compliant elements may be devised to be effective only in a specific frequency range, for instance.

In the above, the pad 110 is construed broadly to include one or more rigid, semi-rigid, or other suitable materials that are effective in supporting and transmitting force feedback, and shaped in any geometry deemed suitable for a given application. As a way of example in the embodiment of FIG. 1 (or 2), the pad 110 is shown to have a contact surface 112 that is substantially planar. This should not be construed as limiting in any manner, however. In alternative embodiments, the contact surface 112 can be equipped with a non-planar topology, e.g., adapted for a particular body part (e.g., a hand or an arm), for instance. The pad 110 can also be of non-uniform thickness. For example, in one embodiment, the pad 110 may have a relatively small thickness, so as to exhibit the haptic effects as forcefully as possible. In another embodiment, the pad 110 can be shaped such to exhibit the haptic effect preferentially at a particular location (or "haptic sweet spot"), as further described below.

Further, the circuitry 130 serves to send control signals to the actuator 120 that render haptic effects. In one embodiment, the circuitry 130 can include a data communication interface, such as a USB port, a wireless receiver/transmitter, or other types of wired or wireless data communication means known in the art for interfacing between a processor (such as a computer) and an actuator. In another embodiment, the circuitry 130 can also include a "local" processor, configured to generate control signals based on the instructions from a "host" processor (such as the processor 270 of FIG. 2). In either case, the circuitry 130 can further include appropriate electronic circuits devised to facilitate the operation of the actuator 120. Such electronic circuits may include power supplies, amplifiers, and the like.

By way of example, the processor 270 of FIG. 2 is shown within the computer 275 that also includes a display screen 272. The processor 270 can generally be embodied, for example, in a personal computer (such as desktop or laptop), a workstation, or one of a variety of home video game console systems commonly connected to a television set or other display screen. Alternatively, the processor 270 can also be a stand-alone controller or other known processing means, capable of controlling and coordinating between a haptic device and a user-interface device (or an internal event), as described above. The processor 270 can be further equipped with networking capabilities, for instance. The display screen 272, under control of the processor 270, can include, for example, one of an LCD panel, a CRT monitor, a TV set, a 3-D goggle (e.g., worn by a user), or other known display means.

The user-interface device 260 includes, but is not limited to, for example: a mouse, a joystick, a trackball, a touch panel, a direction pad, a stylus, a keyboard, a gamepad, a steering wheel, a knob, a remote control, a graphic tablet, a medical instrument (such as a laparoscope or a catheter), or other types of known user-interface devices. As described above, a user can manipulate (e.g., translate and/or rotate) the user-interface device 260 on the contact surface 112 of the pad 110, and experience the haptic effect thus imparted to the pad 110 via the user-interface device 260. In other embodiments, a user can manipulate a user-interface device by one hand at one location, and be in contact with the pad 110 by the other hand at a separate location. A user can also experience the haptic sensations by way of other body parts in contact with the pad 110 (e.g., the contact surface 112). As a way of example, a user can use two hands to play a gamepad, while placing one (or both) of the elbows on the pad 110, so as to experience the corresponding haptic effects. Moreover, the haptic device 110 can also be used as an extension of a user-interface device (e.g., a keyboard), or a laptop computer, serving as a "haptic wrist rest," for instance.

Figure 6:
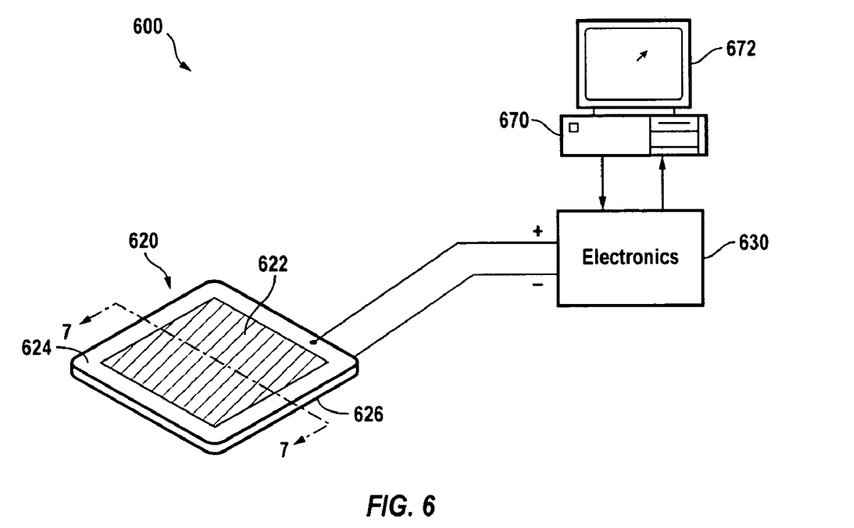
FIG. 6 depicts an arrangement of a "haptic pad" equipped with an electroactive polymer actuator, according to an embodiment of the invention.

The actuator 120 may be a pager motor, an inertial actuator, an eccentric rotating motor (e.g., a motor with an eccentric mass coupled to its shaft), a harmonic eccentric rotating motor (a motor with an eccentric mass flexibly coupled to its shaft), a voice coil actuator, a solenoid actuator, a piezoelectric actuator, an electroactive polymer actuator, a hydraulic actuator, a pneumatic actuator or other types of actuators suitable for generating haptic (e.g., vibrotactile) effects. U.S. Pat. Nos. 6,429,846 and 6,424,333 disclose further details relating to some of these actuators, both of which are incorporated in full herein by reference. For purposes of illustration in the above, the actuator 120 is shown to be attached to the underside 114 of the pad 110. This should not be construed as limiting in any manner, however. In other embodiments, the actuator 260 can also be attached to the contact surface 112 of the pad 110 (see FIG. 3 for example), or coupled to other parts of the pad 110 as deemed suitable in a given application. In some situations, it may be desirable to attach a piezoelectric or an electroactive polymer layer to an appropriate section of the pad 110 as an actuator. FIG. 6 depicts one embodiment of a "haptic pad" having an electroactive polymer actuator. Alternatively, multiple actuators can also be implemented in a haptic device. In addition, various control schemes can be devised accordingly for controlling the actuator(s) in a manner that best achieves the desired haptic effects.

In a haptic device, a pad (such as the pad 110 above) may be further configured to exhibit a "haptic sweet spot." By judiciously selecting the underlying composition and geometry of the pad, along with the locations of one or more actuators, the haptic effect (e.g., vibrations) imparted to the pad can be most pronounced at a particular location on the pad, termed a "haptic sweet spot" herein. In one embodiment, this may be accomplished by maintaining the contact surface 112 substantially planar, while shaping the underside 114 according to a pre-determined profile (e.g., by thinning some regions while thickening other regions underneath the contact surface 112) devised in accordance with the placement of the actuator 120 (and other external factors).

Figure 3:
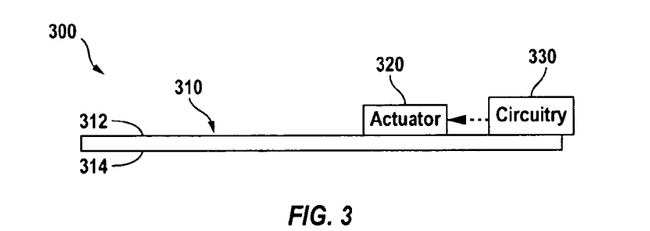
FIG. 3 shows another embodiment of a haptic device of the invention.

FIG. 3 shows another embodiment of a haptic device 300 of the invention. By way of example, the haptic device 300 comprises: a pad 310; an actuator 320; and a circuitry 330. The pad 310 can include a contact surface 312 and an underside 314. The actuator 320, along with the circuitry 330, is coupled to the contact surface 312. The constituent components as shown may be substantially similar to the counterparts described above with respect to the haptic device 100. The operation of this device as a whole can also be similar to that of the haptic device 100 described above, other than that there are no compliant elements implemented in this embodiment. As such, the haptic device 300 may operate in conjunction with one or more external compliant elements. For instance, the underside 314 of the pad 310 may be disposed on a conventional mouse pad, or other means that is effective in providing mechanical isolation to the haptic device 300.

Figure 4:
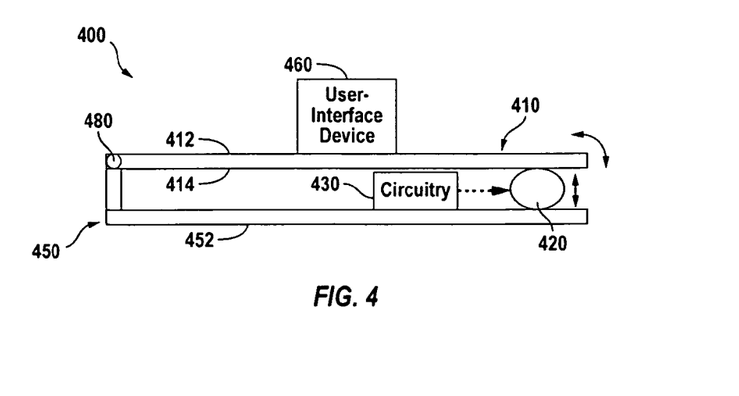
FIGS. 4-5 show two alternative embodiments of a haptic device of the invention.
Figure 5:
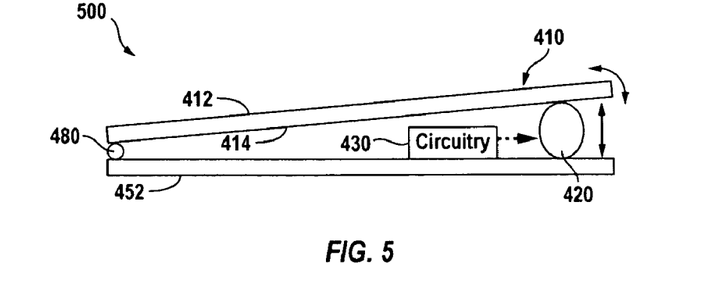

FIGS. 4-5 depict two alternative embodiments of a haptic device of the invention. FIG. 4 depicts a haptic device 400, comprising: a pad 410 having a contact surface 412 and an underside 414; an actuator 420, a circuitry 430; and an "L-shaped" support 450 which may include a base member 452. In this embodiment, the pad 410 is shown to be pivotally coupled to the support 450 on one end, e.g., by way of a "hinge-like" element 480. The actuator 420 is coupled to the underside 414 of the pad 410, e.g., disposed (e.g., snuggly sandwiched) between the other (or "free") end of the pad 410 and the base member 452. In this manner, as the actuator 420 acts under a control signal from the circuitry 430, it effectively causes the pad 410 to move up and down pivotally about the hinge element 480, thereby imparting haptic sensations to a user manipulating a user-interface device 460 on (and/or in direct contact with) the contact surface 412 by virtue of the movement of the pad 410. For purposes of illustration, the circuitry 430 is shown to be attached to the base member 452; however, it can also be placed elsewhere in alternative embodiments.

In FIG. 4, the pad 410 and the circuitry 430 may be configured similarly to their counterparts in the haptic device 100 of FIG. 1. The actuator 420 may be one of the actuators described above. As such, the haptic device 400 can be used in a manner similar to what is described above with respect to the haptic device 100.

The embodiment of FIG. 4 can also be configured in a number of alternative ways, without departing from the general operation principles described above. By way of example, FIG. 5 depicts a haptic device 500 that is similar to the haptic device 400 of FIG. 4, hence like elements are labeled with like numerals. In this example, the pad 410 is shown to be directly coupled to the base member 452 on one end, e.g., by way of the hinge element 480. The actuator 420 is disposed between the other (or "free") end of the plate 410 and the base member 452 such that, as the actuator 420 acts under a control signal from the circuitry 430, it effectively causes the pad 410 to move pivotally about the hinge element 480 (e.g., in a manner like a "sea-saw"), thus imparting haptic sensations to a user in contact with the pad 510.

Figure 7:
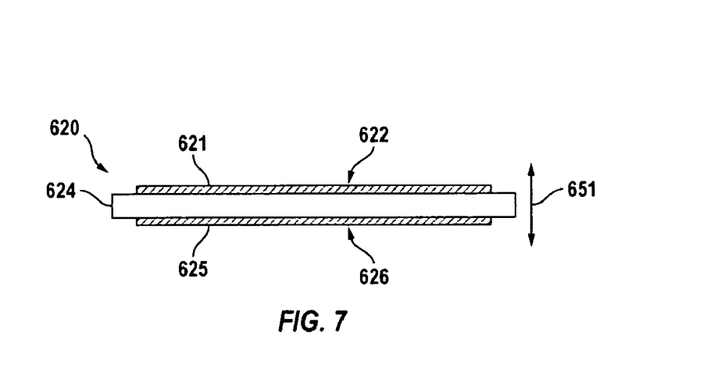
FIG. 7 depicts a cross-sectional view of the haptic pad shown in FIG. 6.

FIG. 6 depicts an arrangement 600 of a "haptic pad" 620 having an "electroactive polymer" actuator, shown in a perspective view according to an embodiment of the invention. By way of example, the haptic pad 620 comprises an electroactive polymer 624 which may for example form a layer (or sheet), disposed between a first member 622 and a second member 626. FIG. 7 further illustrates in a cross-sectional side view of the haptic pad 620. As shown in FIG. 7, the first member 622 includes a first surface 621 that can be configured as a contact surface (e.g., similar to the contact surface 112 of FIG. 1), to which a user-interface device (e.g., a computer mouse) may be removably coupled, as described above with respect to the embodiment of FIG. 1 or 2. A first surface 625 of the second member 626 may be disposed on a ground surface such as a desktop (not explicitly shown). The first and second members 622, 626 are electrically conductive and compliant, serving as first and second electrodes to the electroactive polymer 624. A circuitry (or "electronics") 630 is coupled to the first and second members 622, 626, and is configured to provide appropriate control signals (e.g., electric voltages). The circuitry 630 is under control of a processor 670, which may be embodied in a computer that also includes a display screen 672 as shown in FIG. 6.

Electroactive polymers are known as a class of polymers that can be formulated and/or fabricated to exhibit a wide range of mechanical, electrical, and electro-optical behaviors. When activated (e.g., under application of an appropriate electric voltage), an electroactive polymer can undergo significant physical movement or deformation, typically referred to as electrostriction. Such deformation can take place along the length, width, thickness, and radius of the material. A further discussion on various types of electroactive polymers can be found in, for example: "High-field electrostriction of elastomeric polymer dielectrics for actuator," by Kornbluh et al.; "Electro-mechanics of ion-elastic beams as electrically-controllable artificial muscles," by M. Shahinpoor, "Polymer Electrolyte Actuator with Gold Members," by K. Oguro et al.; and "Microgripper design using electro-active polymers," by R. Lumia et al., SPIE Conference on Electroactive Polymer Actuators and Devices, SPIE Vol. 3669, 1999; all disclosures of which are incorporated by reference.

Electrostrictive polymers can be classified in two classes: dielectric and phase transition. Dielectric electrostrictive polymers are typically in a sandwich construction of two electrically conductive and compliant members. When subject to a sufficiently high electric field (e.g., a few hundred volts), the attractive force between the conductive members "squeezes" the intervening dielectric, thereby giving rise to a significant deformation. In some cases, the deformation can be as much as, or greater than fifty percent. U.S. Pat. No. 6,376,971 discloses methods for deforming dielectric electrostrictive polymers and constructing actuators thereof, the disclosure of which is incorporated herein by reference.

Referring back to the embodiment of FIG. 6, the electroactive polymer 624 can include a dielectric electrostrictive polymer material. The first and second members 622, 626 can be configured to conform (or be compliant) to the changing shape of the electroactive polymer 624. The circuitry 630 operates to apply electric (e.g., voltage) signals to the first and second members 622, 626, such that the electroactive polymer 624 undergoes deformations along a "vertical" direction (or "z-axis") 651 that is substantially perpendicular to the contact surface 621. For example, under application of an appropriate voltage signal, the electroactive polymer 624 can be compressed along the vertical direction 651, thus causing a vertical displacement of a user-interface device (e.g., a mouse) that is moveably disposed on it. Further, by varying the applied voltage signal at an appropriate frequency, the electroactive polymer 624 can be rapidly compressed and relaxed in an alternate fashion, thereby imparting tactile-like sensations to the user wielding the mouse. A suitable control scheme for controlling the haptic pad 620 can be designed, so as to render desired haptic effects in a given application.

The first and second members 622, 626 can each include a conductive material, e.g., coated on two opposing sides of the electroactive polymer 624. They may further include one or more additional layers that provide compliance, protection, and/or support. Such layers can be made of rubber, fabric, or other elastic materials, for instance. Alternatively, the first and second members 622, 626 can include two conductive and flexible layers (or sheets), being attached to and thereby sandwiching the electroactive polymer 624 therein between. In some cases, either of the first and second members 622, 626 (or the underlying conductive material) can also be of a spatial pattern according to a predetermined scheme, configured to cause non-uniform deformations in different regions of the electroactive polymer 624. Further, the contact surface 621 provided by the first member 622 can be made substantially planar, e.g., configured to look and/or feel like a conventional "mouse pad," if so inclined in a given application.

The electroactive polymer 624 may be of a thickness (e.g., in the vertical direction 651) effective for achieving desired deformations. For example, the electroactive polymer 624 can include one or more sheets of dielectric electrostrictive polymer material (such as those available commercially) stacked between the first and second members 622, 626, so as to achieve substantial deformations. In this case, the electroactive polymer sheets may each have its own electrode members, e.g., stacked like parallel capacitors.

The circuitry 630 of FIG. 6 may be substantially similar to the circuitry 130 of FIG. 1 (or 2) in configuration and operation. The processor 670 can also be substantially similar to the processor 270 of FIG. 2 in configuration and operation. For instance, the circuitry 630 can include a data communication interface, e.g., a USB or wireless receiver/transmitter, for communicating with the processor 670. It may further include appropriate power suppliers/amplifiers for energizing the haptic pad 620. For instance, the circuitry 630 can include transforming electronics capable of transforming low voltage signals from the processor 670 to high voltage (and low current) signals to be applied to the first and second members 622, 626. The circuitry 630 may draw power from the processor 670, and/or from an external power supply (e.g., one or more batteries). A suitable circuitry for powering the haptic pad 620 and for communicating with the processor 670 can be designed, for a given application.

The haptic pad 620 of FIG. 6 can be used in a manner substantially similar to that described with respect to the haptic device 100 of FIG. 1 (or 2), such as imparting haptic sensations in coordination with manipulation of a user-interface device, or an internal event being displayed and/or otherwise output by in a computer (or video) system. Having an electro-active polymer, the haptic device 620 of FIG. 6 can further act as both an actuator and a sensor, as described below.

An electroactive polymer material can undergo physical deformation under application of an electric signal; it can also output an electrical signal under action of a strain (or pressure). This "duality" enables the haptic pad 620 of FIG. 6 to be used as both an actuator and a sensor. As described above, the circuitry 630 can be configured to cause the electroactive polymer 630 to constrict, so as to impart tactile sensations in response to a user's manipulation of a user-interface device (e.g., a mouse). The circuitry 630 can be further configured to detect electrical signals (e.g., voltage changes) resulting from the pressure exerted by a user on the electroactive polymer 624. This can be useful in a number of ways. For instance, it can be used by the processor 670 to determine whether the user-interface device is being held/manipulated by the user. It can also be used as a "dead-man" switch, e.g., to disable the power supply to the haptic pad 620 when the user-interface device is not in use, or no user contact is made with the haptic pad 620. It can further be used to indicate an analog z-axis control related to downward pressure in the vertical direction 651. It can additionally be used to provide one or more auxiliary user inputs. As a way of example, stenciled regions representing buttons (or other discrete features) can be "silk-screened" on the contact surface 621, with separate electrode members positioned underneath such buttons. For instance, a button designated as "Internet" can be implemented on the contact surface 621. A user can press the button with his/her finger, and it will be reported to the processor 670 and responded accordingly.

As such, the embodiments of the invention can be used as "generic" haptic-output devices to enhance users' interactions with computer/video systems. For instance, such haptic devices can work in conjunction with and thereby provide "haptic augmentations" to conventional (or "non-haptic") user-interface devices, irrespective of their types and manufactures. Such haptic devices can also act as stand-alone devices to convey information to a user by way of haptic sensations.

Those skilled in the art will recognize that the embodiments described above are provided by way of example, to elucidate the general principles of the invention. Various means and methods can be devised to perform the designated functions in an equivalent manner. Moreover, various changes, substitutions, and alternations can be made herein without departing from the principles and the scope of the invention.

What is claimed is:

1. An apparatus, comprising:
a contact surface; and
an actuator coupled to the contact surface, the actuator configured to receive a control signal and output a haptic effect to the contact surface, the control signal being associated with an input signal from a user-interface device and being generated in response to a processor receiving the input signal from the user-interface device, the user interface device being physically distinct from and removably coupled to the contact surface, the user interface device being configured to communicate with the processor, including sending the input signal thereto.

2. An apparatus as recited in claim 1 wherein the user-interface device is disposed on and manipulable with respect to the contact surface.

3. An apparatus as recited in claim 2 wherein the haptic effect imparts a tactile sensation.

4. An apparatus as recited in claim 1 further comprising at least one compliant element coupled to the contact surface, the compliant element configured to mechanically isolate the contact surface such that the haptic effect is maximized.

5. An apparatus as recited in claim 1 wherein the actuator is configured to receive the control signal from the processor via a circuitry coupled to the contact surface.

6. An apparatus as recited in claim 5 wherein the circuitry includes a local processor.

7. An apparatus as recited in claim 1 wherein the user-interface device includes one of a mouse, a touch panel, a joystick, a trackball, a stylus, a keyboard, a direction pad, a gamepad, a steering wheel, a knob, a graphical tablet, a remote control, and a medical instrument.

8. An apparatus as recited in claim 1 wherein the contact surface is included in a pad.

9. An apparatus as recited in claim 8 wherein the pad is configured such that the haptic effect is optimized at a particular location on the contact surface.

10. An apparatus as recited in claim 1 further comprising:
a support including a base member, the contact surface being pivotally coupled to the support, the actuator being disposed between the base member and the contact surface.

11. An apparatus as recited in claim 10 wherein the contact surface is pivotally coupled to the base member.

12. An apparatus as recited in claim 1 wherein the user-interface device is configured to operate on a surface physically distinct from the contact surface.

13. An apparatus, comprising:
a contact surface; and
an actuator means for providing a haptic effect to said contact surface, said actuator means configured to receive a control signal and output a haptic effect to the contact surface, the control signal being responsive to an input signal generated by a user-interface device physically distinct from and removably coupled to the contact surface and being generated in response to a processor receiving the input signal from the user-interface device.

* * * * *